United States Patent
Hall et al.

(10) Patent No.: US 11,932,808 B2
(45) Date of Patent: Mar. 19, 2024

(54) CALCIUM CARBONATE/POLYMER PARTICULATE ADDITIVES FOR USE IN SUBTERRANEAN OPERATIONS

(71) Applicant: Halliburton Energy Services, Inc., Houston, TX (US)

(72) Inventors: Lee J. Hall, The Woodlands, TX (US); Jonathan Walker, Lumberton, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 304 days.

(21) Appl. No.: 17/059,628

(22) PCT Filed: Jun. 28, 2018

(86) PCT No.: PCT/US2018/039929
§ 371 (c)(1),
(2) Date: Nov. 30, 2020

(87) PCT Pub. No.: WO2020/005246
PCT Pub. Date: Jan. 2, 2020

(65) Prior Publication Data
US 2021/0115318 A1 Apr. 22, 2021

(51) Int. Cl.
*C09K 8/516* (2006.01)
*C09K 8/508* (2006.01)
*E21B 43/25* (2006.01)

(52) U.S. Cl.
CPC ............ *C09K 8/516* (2013.01); *C09K 8/5086* (2013.01); *E21B 43/25* (2013.01); *C09K 2208/18* (2013.01)

(58) Field of Classification Search
CPC .. C09K 8/516; C09K 8/5086; C09K 2208/18; E21B 43/25
See application file for complete search history.

(56) References Cited

U.S. PATENT DOCUMENTS

| 4,036,301 A | 7/1977 | Powers et al. |
| 4,664,816 A | 5/1987 | Walker |

(Continued)

FOREIGN PATENT DOCUMENTS

| WO | 2009006731 | 1/2009 |
| WO | 2010113094 | 10/2010 |

(Continued)

OTHER PUBLICATIONS

Great Britain Examination Report for Application No. GB2014982.9 dated Jun. 17, 2022.

(Continued)

*Primary Examiner* — Alicia Bland
(74) *Attorney, Agent, or Firm* — Thomas Rooney; C. Tumey Law Group PLLC

(57) ABSTRACT

Particulate additives that may be useful in mitigating fluid loss and/or as bridging agents or diverting agents in subterranean treatment fluids such as drilling fluids. In some embodiments, the particulate additives include a polymeric material and calcium carbonate disposed on at least a portion of the outer surface of the polymer core wherein the particulates have a particle size (d50) of from about 2 μm to about 1600 μm in diameter. In some embodiments, the methods include providing a treatment fluid that includes the base fluid and the particulate additives and introducing the treatment fluid into at least a portion of a subterranean formation.

17 Claims, 1 Drawing Sheet

(56) References Cited

U.S. PATENT DOCUMENTS

| | | | |
|---|---|---|---|
| 4,986,354 A * | 1/1991 | Cantu | C09K 8/92 166/371 |
| 5,826,669 A | 10/1998 | Zaleski et al. | |
| 6,527,051 B1 | 3/2003 | Reddy et al. | |
| 6,803,347 B1 | 10/2004 | Ladva et al. | |
| 7,044,220 B2 | 5/2006 | Nguyen et al. | |
| 7,066,285 B2 | 6/2006 | Shaarpour | |
| 7,156,174 B2 | 1/2007 | Roddy et al. | |
| 7,204,312 B2 | 4/2007 | Roddy et al. | |
| 7,402,338 B2 | 7/2008 | Weintritt et al. | |
| 7,482,309 B2 | 1/2009 | Ravi et al. | |
| 7,666,469 B2 | 2/2010 | Weintritt et al. | |
| 7,776,797 B2 | 8/2010 | Allin et al. | |
| 8,202,824 B2 | 6/2012 | Reddy et al. | |
| 8,905,136 B2 | 12/2014 | Todd et al. | |
| 9,410,075 B2 | 8/2016 | Todd et al. | |
| 9,909,055 B2 | 3/2018 | Reddy et al. | |
| 9,938,810 B2 | 4/2018 | Nguyen et al. | |
| 10,876,045 B2 | 12/2020 | Holtsclaw et al. | |
| 10,954,431 B2 | 3/2021 | Chittattukara et al. | |
| 11,041,111 B2 | 6/2021 | Nguyen et al. | |
| 11,220,623 B2 | 1/2022 | Gullickson et al. | |
| 2005/0194136 A1 | 9/2005 | Nguyen et al. | |
| 2005/0284641 A1 | 12/2005 | Watkins et al. | |
| 2006/0096759 A1 * | 5/2006 | Reddy | C09K 8/516 166/295 |
| 2006/0166838 A1 * | 7/2006 | Collins | C09K 8/536 507/219 |
| 2006/0276345 A1 | 12/2006 | Todd et al. | |
| 2008/0210428 A1 | 9/2008 | Javora et al. | |
| 2011/0214862 A1 * | 9/2011 | Horton | C09K 8/42 507/272 |
| 2015/0210916 A1 | 7/2015 | Soane et al. | |

FOREIGN PATENT DOCUMENTS

| | | |
|---|---|---|
| WO | 2015035520 | 3/2015 |
| WO | 2017/048234 A1 | 3/2017 |
| WO | 2017/131707 A1 | 8/2017 |

OTHER PUBLICATIONS

International Preliminary Report on Patentability issued in related PCT Application No. PCT/US2018/039929 dated Jan. 7, 2021, 10 pages.

International Search Report and Written Opinion issued in related PCT Application No. PCT/US2018/039929 dated Mar. 27, 2019, 13 pages.

Great Britain Examination Report for Application No. GB2014982.9 dated Mar. 18, 2022.

* cited by examiner

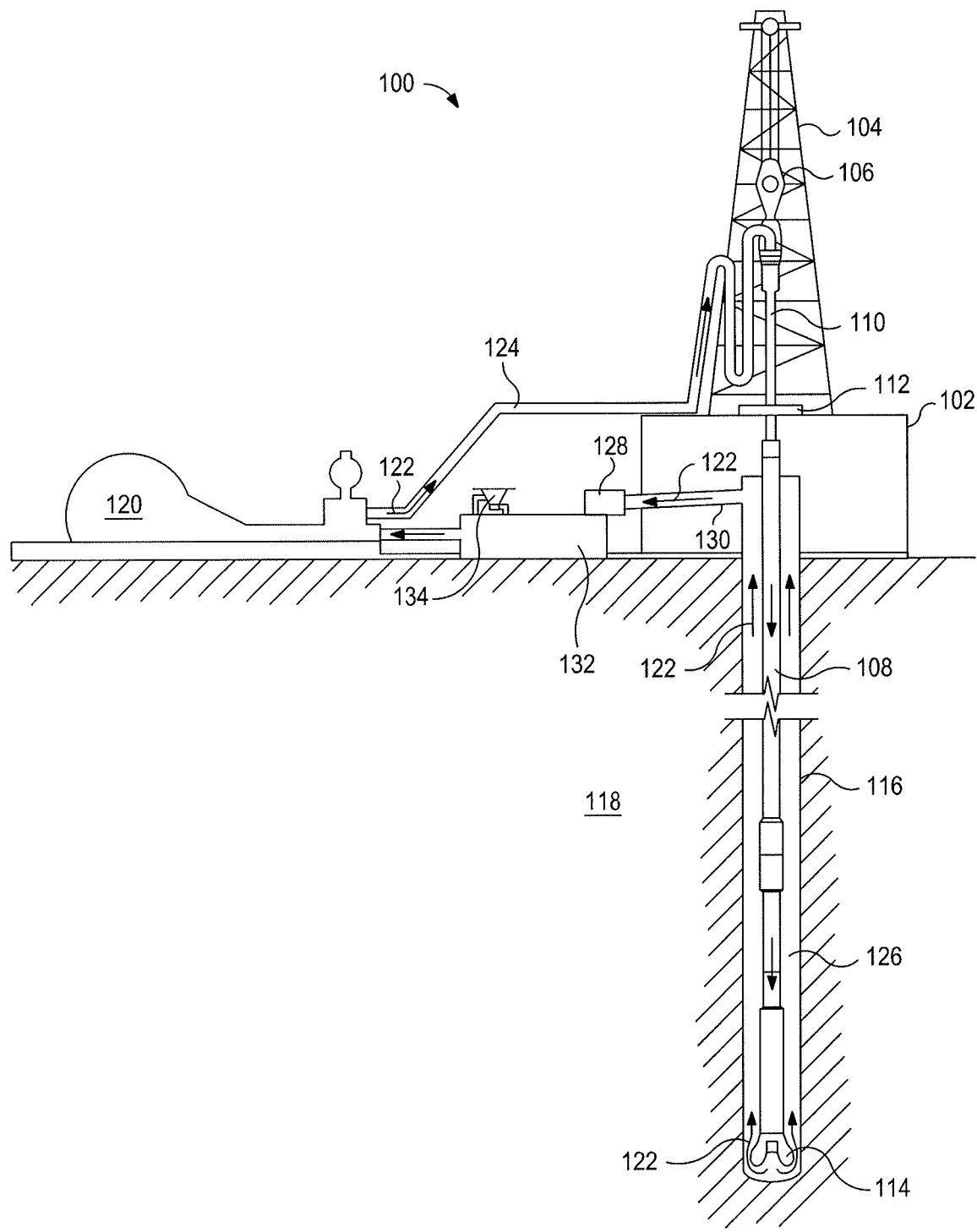

CALCIUM CARBONATE/POLYMER PARTICULATE ADDITIVES FOR USE IN SUBTERRANEAN OPERATIONS

CROSS-REFERENCE TO RELATED APPLICATION

The present application is a U.S. National Stage Application of International Application No. PCT/US2018/039929 filed Jun. 28, 2018, which is incorporated herein by reference in its entirety for all purposes.

BACKGROUND

The present disclosure relates to systems and methods for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes. A drilling fluid, or "mud" which a drilling fluid is also often called, is a treatment fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

Drilling fluids and other subterranean treatment fluids, inter alia, deposit filter cake on the walls of well bores within the producing formations to substantially prevent drilling, servicing, and completion fluids from being lost into the formation and solids from entering into the porosities of the formation. In many cases, a particulate solid bridging agent (also sometimes referred to as a diverting agent or fluid loss control additive) is included in the treatment fluid for bridging over and/or sealing formation pores or other openings. Such areas include formation pore throats, gravel packs, sand screens, or fractures in the formation as well as openings such as cracks in tubing or casing, holes in sand screens, or on other perforations downhole such as in a shroud, casing, or other tubing. By bridging across and sealing off such areas, the bridging agents may form a substantially impermeable "filter cake" on that area that prevents loss of treatment fluids to the surrounding formation. At some point after the well bore is drilled, however, it is often desirable to at least partially remove the filter cake from the walls of the well bore, among other reasons, to facilitate cementing operations and/or production in the well.

BRIEF DESCRIPTION OF THE DRAWINGS

These drawings illustrate certain aspects of some of the embodiments of the present disclosure, and should not be used to limit or define the claims.

FIG. 1 is a diagram illustrating an example of a well bore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to particulate additives that may be useful in mitigating fluid loss and/or as diverting agents in subterranean treatment fluids such as drilling fluids.

The present disclosure provides composite particulate additives for use as diverting agents, bridging agents, lost circulation control agents, and/or fluid loss control agents that include a polymer core (e.g., in the form of a particle, bubble, or shell) including a polymeric material and calcium carbonate disposed on at least a portion of the outer surface of the polymer core. The particle sizes of the additives of the present disclosure (e.g., the outermost diameter of a particle, including the thickness of the calcium carbonate on the outer surface of the polymer core) generally should be of an appropriate size to act as a diverting agent, bridging agent, lost circulation control agent, and/or fluid loss control agent when introduced into at least a portion of a subterranean formation, for example, by forming a filter cake on a surface in a subterranean formation and/or plugging pore throats in the formation matrix, either alone or in conjunction with one or more other particles. Generally, the particles of such additives have a particle size (d50) of from about 2 μm to about 1600 μm in diameter. The additives of the present disclosure may be mixed with other components (e.g., a base fluid, other fluid loss additives or diverting agents, other additives, etc.) to form a treatment fluid that is then introduced into at least a portion of a subterranean formation to perform one or more operations therein.

Among the many potential advantages to the methods and compositions of the present disclosure, only some of which are alluded to herein, the additives, methods, compositions, and systems of the present disclosure may provide improved sealing and/or particulate packing in the pore throats or other areas of the formation, inter alia, because the particulates disclosed herein are more compliant and/or less brittle than certain conventional particulate bridging agents known in the art. As a result, smaller amounts of the additives of the present disclosure may provide similar levels of fluid loss control and/or fluid diversion as compared to conventional particulate bridging agents. In some embodiments, the additives of the present disclosure may be more easily removed after use than certain particulate bridging agents in the art that contain no acid-soluble components. In some embodiments, the additives of the present disclosure may be "self-degrading" in that the introduction of additional acid is not required to at least partially degrade and/or remove at least a portion of those additives. In some embodiments, certain properties of the additives of the present disclosure such as dissolution time and/or density may be tuned or tailored for particular applications.

The polymer core may include a solid particle or a hollow bubble or shell (e.g., a microbubble) that is made of any polymeric material. In some embodiments, the polymer core may be at least partially pliable, flexible, or deformable when subjected to compressive forces, which may facilitate the effectiveness of the additive in mitigating fluid loss and/or diverting fluids. In some embodiments, the polymer core may include a solid particle (which may itself include a polymeric material or some other material) that is then coated with a polymeric shell. The polymer core may be made of any polymeric material suitable for forming solid particles, bubbles, or shells. Examples of polymeric materials that may be suitable for certain embodiments include, but are not limited to, vinyl chlorides (e.g., polyvinyl chloride (PVC)), vinylidene chlorides (e.g., polyvinylidene chloride (PVDC)), polyacrylates, polyurethanes, polysulfones, polycarbonates, polyolefins, styrenic polymers, polyamides (e.g., nylon), polyimides, polypropylene, polyethylene, polytetrafluoroethylene, elastomers (e.g., polybutadiene, nitrile polymers), any derivative thereof, and any combination thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "derivative" also includes copolymers, terpolymers, and oligomers of the listed compound. In some embodiments, the polymeric material may include a degradable polymer that may at least partially degrade when exposed to certain conditions or fluids (e.g., water). Examples of such degradable polymers that may be suitable for certain embodiments include, but are not limited to, aliphatic polyesters, poly(lactides), (e.g., polylactic acid (PLA)), poly(glycolides), poly(F-caprolactones), poly(hydroxy ester ethers), poly(hydroxybutyrates), poly(anhydrides), aliphatic polycarbonates, poly(orthoesters), poly(amino acids), poly(ethylene oxides), polyphosphazenes, and any copolymers, derivatives or combinations thereof.

In embodiments where the polymer core includes a bubble or shell, the bubble or shell may be formed by any suitable means, including but not limited emulsion polymerization, emulsion solvent evaporation, spray drying, phase separation, simple or complex coacervation, or interfacial polymerization. For example, the polymer core may be formed via an invert emulsion polymerization process that forms a plurality of polymer shells surrounding droplets of an aqueous fluid. In embodiments where the polymer core is in the form of a bubble or shell, the thickness of the polymer shell or bubble may be of any suitable thickness. In some embodiments, the thickness of the polymer shell or bubble may range from about 0.01 μm to about 5 μm, or alternatively about 0.1 μm to about 1 μm, or alternatively about 0.2 μm to about 0.5 μm. A person of skill in the art with the benefit of this disclosure will recognize the appropriate thickness of the polymer shell or bubble suitable for a particular embodiment based on, for example, the desired compressive strength and/or pliability of the particle, the desired diffusion time of any gases or liquids contained within the shell or bubble (as described below), and the like.

When the polymer core is in the form of a bubble or shell, the interior space surrounded by the bubble or shell may be hollow or may be at least partially filled with one or more gases or liquids (e.g., an aqueous solution). Examples of gases that may be suitable in certain embodiments include, but are not limited to, hydrocarbon gases (e.g., methane), oxygen, nitrogen, helium, and any combination thereof. In some embodiments, the polymer bubble or shell may be filled with a liquid that includes a solution of one or more treatment additives such as acids (e.g., formic acid), bases (e.g., hydroxides), breakers (e.g., oxidating agents), corrosion inhibitors, friction reducers, and the like. In some embodiments, the liquid inside the polymer shell or bubble may include an acidic solution that may diffuse or leach through the polymer bubble or shell to dissolve the calcium carbonate on the outer surface of the particle and/or other calcium carbonate fluid loss additives or diverting agents in the formation. In such embodiments, the additives of the present disclosure may be characterized as "self-degrading" diverting agents, bridging agents, and/or fluid loss control additives in that the introduction of additional acid is not required to at least partially degrade and/or remove at least a portion of those additives. In certain such embodiments, the thickness and/or permeability of the polymeric material may be selected based on the rate at which the liquid should be released from the polymer shell or bubble. For example, if a long delay or slow rate of release is desired, then a less permeable polymeric material or thicker polymer shell or bubble may be selected.

In some embodiments where the polymer core is hollow or filled with a gas, exposing the particulates to pressure or temperature differentials in a subterranean formation may cause the core to compress or expand. For example, if a polymer core filled with air or other gases is placed in a portion of a subterranean formation having a relatively high temperature (e.g., higher than the temperature at which the polymer core was stored prior to use), exposure to the heat may cause the polymer core to expand in size, in some cases to double, triple, or quadruple its original diameter, which may also cause the thickness of the polymer shell to decrease. This may, among other benefits, facilitate more efficient packing of the additive particles in pore throats or spaces in the formation matrix and/or allow those particles to form a better seal in those pore throats or spaces in the formation.

The calcium carbonate disposed on the outer surface of the polymer core may be distributed in any fashion or form (e.g., as a coating or film, or as distinct clusters or small masses of crystals), and may be disposed on the outer surface of the polymer core in any amount. In some embodiments, the outer surface of the polymer core may be at least partially coated with calcium carbonate, or may be substantially entirely or entirely coated with calcium carbonate. The calcium carbonate may be placed on the polymer core by any suitable means of deposition. For example, in some embodiments, the calcium carbonate may be deposited via various nucleation techniques. In certain such techniques, an aqueous solution of calcium carbonate may be mixed with polymer cores and then titrated to a pH where the calcium carbonate solid precipitates out of the solution. In other embodiments, such a solution may be mixed with or sprayed onto the polymer cores, and then liquid solvent may be evaporated, leaving behind solid calcium carbonate deposited on the polymer cores. When the calcium carbonate is provided as a coating or layer on the outer surface of the polymer core, such coating or film may have any suitable thickness, which may be uniform or variable across the outer surface of the polymer core. For example, in some embodiments, the thickness of the calcium carbonate may range from about 0.01 μm to about 10 μm, or alternatively about 0.05 μm to about 5 μm, or alternatively about 0.1 μm to about 1 μm, or alternatively about 0.2 μm to about 0.5 μm. A person of skill in the art with the benefit of this disclosure will recognize the appropriate thickness of the calcium carbonate suitable for a particular embodiment based on, for example, the desired compressive strength and/or pliability of the particle, the desired dissolution time of the calcium carbonate portion of the particulate additive, and the like.

The additives of the present disclosure may include particulates of any shape or size that is appropriate for use as a diverting agent, bridging agent, or fluid loss additive, including generally spherical, cylindrical, or irregular shapes. Generally, the particles of such calcium carbonate polymer additives have a d50 particle size of from about 2 µm to about 1600 µm in diameter, or alternatively from about 10 µm to about 1200 µm in diameter, or alternatively from about 20 µm to about 400 µm in diameter, or alternatively from about 20 µm to about 100 µm in diameter, or alternatively from about 50 µm to about 100 µm in diameter. As noted above, in some embodiments, the polymer core of these particulates may expand when subjected to elevated temperatures, and thus may expand to a size in one or more of these ranges. In some embodiments, the additives of the present disclosure may include particles of substantially different sizes (e.g., a bimodal or multi-modal size distribution), among other reasons, to more effectively block pore throats or spaces in the formation. Examples of commercially available microspheres that may be suitable for use as the additives in certain embodiments of the present disclosure include certain microsphere products sold under the DUALITE® tradename and manufactured by Henkel AG & Co. KGaA. Examples of commercially available microspheres that may be suitable for use as the polymer core in certain embodiments of the present disclosure are the microsphere products sold under the EXPANCEL® tradename available from Akzo Nobel N.V.

In some embodiments, the particles of the additives of the present disclosure may further include an outer polymer coating on the outer surface of the calcium carbonate, which may include any of the polymeric materials listed above or any combination thereof. This outer polymer coating may delay or slow the rate at which the calcium carbonate is exposed to acids or other fluids in the formation that may dissolve it, which may increase the amount of time that the additive is able to control fluid loss or divert fluids in the formation. In some embodiments, the outer polymer coating may include one or more acid-releasing polymers (e.g., PLA) that releases an acid when it degrades or is exposed to certain fluids (e.g., water), and the released acid may be used to dissolve the calcium carbonate remaining on the outer surface of the polymer core and/or other calcium carbonate-based fluid loss additives or diverting agents in the formation. In such embodiments, the additives of the present disclosure may be characterized as "self-degrading" diverting agents, bridging agents, and/or fluid loss control additives in that the introduction of additional acid is not required to at least partially degrade and/or remove at least a portion of those additives.

The treatment fluids used in the methods and systems of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons (e.g., diesel, mineral oil, or linear olefins and paraffins), organic liquids, and the like. In certain embodiments, the fracturing fluids may include a mixture of one or more fluids and/or gases, including but not limited to emulsions (e.g., invert emulsions), foams, and the like.

The additives of the present disclosure may be included in a treatment fluid of the present disclosure in any amount suitable to provide the desired amount of fluid loss and/or diversion, either alone or in combination with other particulate fluid loss additives or diverting agents in the fluid. In some embodiments, the calcium carbonate polymer additives of the present disclosure may be included in a treatment fluid in amount of from about 1 pounds per barrel of fluid ("lbs/bbl") to about 200 lbs/bbl, or alternatively, from about 10 lbs/bbl to about 150 lbs/bbl, or alternatively, from about 50 lbs/bbl to about 110 lbs/bbl, or alternatively, from about 20 lbs/bbl to about 60 lbs/bbl. The amount of calcium carbonate polymer additives to include in a treatment fluid according to the present disclosure may vary depending on certain factors that will be apparent to those of skill in the art with the benefit of this disclosure, including but not limited to the porosity of the formation in which the treatment fluid will be used, the presence of other fluid loss additives or diverting agents in the fluid, and the like. In some embodiments, the amounts/concentrations of the additives of the present disclosure used may be less than the amounts/concentrations of conventional diverting agents or fluid loss additives that would otherwise be necessary to provide the desired amount of fluid diversion or fluid loss control.

In certain embodiments, the treatment fluids used in the methods and systems of the present disclosure optionally may include any number of additional additives. Examples of such additional additives include, but are not limited to, salts, surfactants, acids, proppant particulates, additional diverting agents, additional fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. For example, in some embodiments, the calcium carbonate polymer additives of the present disclosure may be used in combination with one or more conventional fluid loss additives and/or diverting agents, such as calcium carbonate particles, graphite-based particles, and the like. In these embodiments, the calcium carbonate polymer additives of the present disclosure may have a substantially similar particle size and/or specific gravity as the conventional fluid loss additives and/or diverting agents with which they are used. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the additives of the present disclosure and/or other components of the treatment fluid may be metered directly into a base treatment fluid to form a treatment fluid. In certain embodiments, the base fluid may be mixed with the additives of the present disclosure and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used as a drilling fluid in drilling at least a portion of a well bore to penetrate at least a portion of a subterranean formation. In certain embodiments, a treatment fluid may be introduced into a subterranean formation. In certain embodiments, the treatment fluid may be introduced into a well bore that penetrates a subterranean formation.

In some embodiments, the additives of the present disclosure may be incorporated into a drilling fluid that is used in drilling at least a portion of a well bore to penetrate at least a portion of the subterranean formation. As the drilling fluid is circulated in the well bore during drilling, the additives of the present disclosure (either alone or in combination with other particulate additives) may at least partially obstruct pore throats or other spaces in the well bore walls. In other embodiments, the additives of the present disclosure may be incorporated into a relatively small volume of fluid (e.g., about 200 bbl or less) such as a drilling fluid or a viscosified gel that is introduced into a portion of a subterranean formation, e.g., a treatment pill such as a lost circulation pill, to mitigate or prevent the loss of fluid into a specific region of the formation (e.g., thief zones). In these embodiments, the fluid carrying the additives of the present disclosure may be pumped to the specific region of interest, and the particulate additives of the present disclosure may be deposited in that region to form a pack of particulates that can at least partially close or seal off that region of the formation and divert the flow of fluids away from that region.

After the additives of the present disclosure have performed their function in reducing fluid loss and/or diverting fluids, in some embodiments, they may remain in the formation or may be removed from the formation through any suitable means. In some embodiments, the calcium carbonate portions of the additives of the present disclosure may be dissolved using one or more acids. For example, an acidic solution may be introduced into the portion of the subterranean formation where the additives of the present disclosure have been placed. In other embodiments, certain "self-degrading" additives of the present disclosure may release an acid (e.g., an acid produced by degradation or hydrolysis of a polymer provided therewith, or an acid that leaches out of the polymer shell or bubble) that can then dissolve the calcium carbonate. After dissolution of the calcium carbonate, in some embodiments, any remaining portions of the polymer cores may be carried out of the formation, for example, with treatment fluids that are flowed back out of the formation, or the polymeric materials may degrade in the formation over time.

The additives disclosed herein may directly or indirectly affect one or more components or pieces of equipment associated with the preparation, delivery, recapture, recycling, reuse, and/or disposal of the disclosed additives and fluids. For example, and with reference to FIG. 1, the disclosed additives and/or fluids may directly or indirectly affect one or more components or pieces of equipment associated with an example of a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed additives may be stored, reconditioned, and/or regulated until added to the drilling fluid 122.

As mentioned above, the disclosed fluids and/or additives may directly or indirectly affect the components and equipment of the drilling assembly 100. For example, the disclosed fluids and/or additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the disclosed fluids and/or additives.

The disclosed fluids and/or additives may directly or indirectly affect the pump 120, which representatively includes any conduits, pipelines, trucks, tubulars, and/or pipes used to fluidically convey the fluids and/or additives downhole, any pumps, compressors, or motors (e.g., topside or downhole) used to drive the fluids and/or additives into motion, any valves or related joints used to regulate the pressure or flow rate of the fluids and/or additives, and any sensors (i.e., pressure, temperature, flow rate, etc.), gauges, and/or combinations thereof, and the like. The disclosed fluids and/or additives may also directly or indirectly affect the mixing hopper 134 and the retention pit 132 and their assorted variations.

The disclosed fluids and/or additives may also directly or indirectly affect the various downhole equipment and tools that may come into contact with the fluids and/or additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids and/or additives may also directly or indirectly affect any downhole heat exchangers, valves and corresponding actuation devices, tool seals, packers and other wellbore isolation devices or components, and the like associated with the wellbore 116. The disclosed fluids and/or additives may also directly or indirectly affect the drill bit 114, which may include, but is not limited to, roller cone bits, PDC bits, natural diamond bits, any hole openers, reamers, coring bits, etc.

While not specifically illustrated herein, the disclosed fluids and/or additives may also directly or indirectly affect any transport or delivery equipment used to convey the fluids and/or additives to the drilling assembly 100 such as, for example, any transport vessels, conduits, pipelines, trucks, tubulars, and/or pipes used to fluidically move the fluids and/or additives from one location to another, any pumps, compressors, or motors used to drive the fluids and/or additives into motion, any valves or related joints used to regulate the pressure or flow rate of the fluids and/or additives, and any sensors (i.e., pressure and temperature), gauges, and/or combinations thereof, and the like.

An embodiment of the present disclosure is a method including: providing a treatment fluid that includes a base fluid and a particulate additive, wherein the particulates each include a polymer core and calcium carbonate disposed on at least a portion of an outer surface of the polymer core, wherein the particulates have a particle size (d50) of from about 2 μm to about 1600 μm in diameter; and introducing the treatment fluid into at least a portion of a subterranean formation.

In one or more embodiments described in the preceding paragraph, the polymer core includes a solid particle that includes a polymeric material. In one or more embodiments described above, the polymer core includes a shell surrounding an interior space, wherein the shell includes a polymeric material. In one or more embodiments described above, the interior space contains a gas. In one or more embodiments described above, the interior space contains a liquid. In one or more embodiments described above, the liquid in the interior space includes an acid. In one or more embodiments described above, the particulates each further include an outer polymer coating on an outer surface of the calcium carbonate. In one or more embodiments described above, the outer polymer coating includes polylactic acid. In one or more embodiments described above, the treatment fluid is a treatment pill having a volume of about 200 bbl or less. In one or more embodiments described above, the particulates have a particle size (d50) of from about 20 μm to about 100 μm in diameter.

Another embodiment of the present disclosure is a method including: providing a drilling fluid that includes a base fluid and a particulate fluid loss control additive, wherein the particulates each include a polymer core and calcium carbonate disposed on at least a portion of an outer surface of the polymer core, wherein the particulates have a particle size (d50) of from about 2 μm to about 1600 μm in diameter; and using the drilling fluid to drill a well bore that penetrates at least a portion of a subterranean formation.

In one or more embodiments described in the preceding paragraph, the method further includes forming at least a portion of a filter cake on at least a portion of a wall of the well bore, wherein the filter cake includes the particulate fluid loss control additive. In one or more embodiments described above, the particulates each further include an outer polymer coating on an outer surface of the calcium carbonate. In one or more embodiments described above, the outer polymer coating includes polylactic acid. In one or more embodiments described above, the particulates have a particle size (d50) of from about 20 μm to about 100 μm in diameter.

Another embodiment of the present disclosure is a self-degrading particulate bridging agent including: a plurality of particulates, wherein each of the particulates includes a polymer core, calcium carbonate disposed on at least a portion of an outer surface of the polymer core, and an outer polymer coating on an outer surface of the calcium carbonate that includes an acid-releasing polymer, wherein the particulates have a particle size (d50) of from about 2 μm to about 1600 μm in diameter.

In one or more embodiments described in the preceding paragraph, the acid-releasing polymer includes polylactic acid. In one or more embodiments described above, the polymer core includes a shell surrounding an interior space, wherein the shell includes a polymeric material. In one or more embodiments described above, the interior space contains a liquid. In one or more embodiments described above, the particulates have a particle size (d50) of from about 20 µm to about 100 µm in diameter.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims.

Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid that comprises a base fluid and a particulate additive, wherein the particulates each comprise a polymer core and calcium carbonate disposed on at least a portion of an outer surface of the polymer core, wherein the particulates have a particle size (d50) of from about 2 µm to about 1600 µm in diameter, wherein the calcium carbonate has a thickness from about 0.1 µm to about 5 µm, wherein the polymer core comprises a shell surrounding an interior space, wherein the shell comprises a polymeric material and the interior space contains a liquid; and
introducing the treatment fluid into at least a portion of a subterranean formation.

2. The method of claim 1, wherein the interior space further contains a gas.

3. The method of claim 1, wherein the liquid in the interior space comprises an acid.

4. The method of claim 1, wherein the particulates each further comprise an outer polymer coating on an outer surface of the calcium carbonate.

5. The method of claim 4, wherein the outer polymer coating comprises polylactic acid.

6. The method of claim 1, wherein the treatment fluid is a treatment pill having a volume of about 200 bbl or less.

7. The method of claim 1, wherein the particulates have a particle size (d50) of from about 20 µm to about 100 µm in diameter.

8. The method of claim 1, wherein the calcium carbonate is a film disposed on the outer surface of the polymer core.

9. The method of claim 1, wherein the calcium carbonate are distinct clusters disposed on the outer surface of the polymer core.

10. A method comprising:
providing a drilling fluid that comprises a base fluid and a particulate fluid loss control additive, wherein the particulates each comprise a polymer core and calcium carbonate disposed on at least a portion of an outer surface of the polymer core, wherein the particulates have a particle size (d50) of from about 2 µm to about 1600 µm in diameter, wherein the calcium carbonate has a thickness from about 0.1 µm to about 5 µm, wherein the polymer core comprises a shell surrounding an interior space, wherein the shell comprises a polymeric material and the interior space contains a liquid; and
using the drilling fluid to drill a well bore that penetrates at least a portion of a subterranean formation.

11. The method of claim 10, further comprising forming at least a portion of a filter cake on at least a portion of a wall of the well bore, wherein the filter cake comprises the particulate fluid loss control additive.

12. The method of claim 10, wherein the particulates each further comprise an outer polymer coating on an outer surface of the calcium carbonate.

13. The method of claim 12, wherein the outer polymer coating comprises polylactic acid.

14. The method of claim 10, wherein the particulates have a particle size (d50) of from about 20 µm to about 100 µm in diameter.

15. The method of claim 10, wherein the calcium carbonate is a film disposed on the outer surface of the polymer core.

16. The method of claim 10, wherein the calcium carbonate are distinct clusters disposed on the outer surface of the polymer core.

17. A method comprising:
providing a treatment fluid that comprises a base fluid and a particulate additive in an amount of about 1 pound per barrel to about 200 pounds per barrel, wherein the particulate additive comprises a polymer core and calcium carbonate disposed as a coating on at least a portion of an outer surface of the polymer core, wherein the particulate additive has a particle size (d50) of from about 2 µm to about 1600 µm in diameter, wherein the calcium carbonate coating has a thickness from about 0.1 µm to about 5 µm, wherein the polymer core comprises a shell surrounding an interior space, wherein the shell comprises a polymeric material and the interior space contains a liquid;
introducing the treatment fluid into at least a portion of a subterranean formation;
reducing fluid loss and/or diverting fluids with the particular additive; and
dissolving at least a portion of the calcium carbonate in the particulate additive.

* * * * *